United States Patent [19]

Petro

[11] Patent Number: 5,349,551
[45] Date of Patent: Sep. 20, 1994

[54] DEVICE FOR AND METHOD OF PREFORMING AN N-BIT MODULAR MULTIPLICATION IN APPROXIMATELY N/2 STEPS

[75] Inventor: John Petro, San Diego, Calif.

[73] Assignee: The United States of America as represented by the Director of National Security Agency, Washington, D.C.

[21] Appl. No.: 99,490

[22] Filed: Jul. 30, 1993

[51] Int. Cl.5 ............................ G06F 7/38; G06F 7/52
[52] U.S. Cl. ..................................... 364/746; 364/754
[58] Field of Search ............... 364/746, 746.1, 754, 364/757

[56] References Cited

U.S. PATENT DOCUMENTS

| | | | |
|---|---|---|---|
| 5,073,870 | 12/1991 | Morita | 364/746 |
| 5,101,431 | 3/1992 | Even | 364/746 |
| 5,144,574 | 9/1992 | Morita | 364/746 |
| 5,289,397 | 2/1994 | Clark et al. | 364/746 |

OTHER PUBLICATIONS

C. K. Koc, C. Y. Hung, Carry-Save Adders for Computing the Product AB Modulo N. Jun. 21, 1990, pp. 899–900, Electronics Letters vol. 26 No. 13.

Forster, Dlay, Gorgui-Naguib, Carry Delayed Save Adders for Computing the Product A.B Modulo N in $LOG_2 N$ Steps, Aug. 30, 1990, pp. 1544–1545, Electronics Letters vol. 26, No. 18.

Takagi, A Radix-4 Modular Multiplication Hardware Algorithm for Modular Exponentiation, Aug. 1992, pp. 949–956, IEEE Transactions on Computers, vol. 41 No. 8.

Primary Examiner—Jerry Smith
Assistant Examiner—Chuong D. Ngo
Attorney, Agent, or Firm—Robert D. Morelli; Thomas O. Maser

[57] ABSTRACT

The present invention relates to a device for and a method of performing an n-bit modular multiplication of $A \times B$ modulo C in approximately n/2 steps, where A denotes a binary multiplier, B denotes a binary multiplicand, and C denotes a binary modulus. A, B, and $-C$ are stored in registers. All variables needed to perform the $A \times B$ modulo C are generated. A partial product register is initialized. The multiplier A is scanned two bits at a time. The value of these two bits determines the multiple of B added to the partial product register. The values 4C, 2C, and C are subtracted from the partial product. If any of these subtractions result in a negative number the result of that subtraction is discarded. The partial product is then shifted two significant positions and stored in the partial product register. These steps are repeated until every bit of A has been scanned. The partial product is then converted to non-redundant form. The value C is then subtracted from the partial product. If the result of this subtraction is positive the result is transmitted as $A \times B$ modulo C. Otherwise the result of this last subtraction is discarded and the partial product existing just prior to this last subtraction is transmitted as $A \times B$ modulo C.

4 Claims, 2 Drawing Sheets

1. Load A, B, -C into individual registers.

2. Generate 2B, 3B, -2C, and -4C.

3. Initialize a partial product register to zero.

4. If the two most significant bits of A are 0, 1, 2, or 3, select 0, B, 2B, or 3B respectively by a multiplexer.

5. Add the value selected in the previous step to the value contained in the partial product register by a full-adder.

6. Add -4C to the result of the previous step by a full-adder.

7. Estimate the sign of the result of the previous step.

8. If the sign in the previous step is estimated to be positive select the result of step 6 otherwise select the result of step 5 by a multiplexer.

9. Add -2C to the value selected in the previous step by a full-adder.

10. Estimate the sign of the result of the previous step.

11. If the sign in the previous step is estimated to be positive select the result of step 9 otherwise select the value selected in step 8 by a multiplexer.

12. Add -C to the value selected in the previous step by a full-adder.

13. Estimate the sign of the result of the previous step.

14. If the sign in the previous step is estimated to be positive select the result of step 12 otherwise select the value selected in step 11.

15. Shift A two significant positions.

16. If bits of A remain load the value selected in step 14 into the partial product register at bit positions two positions more significant and repeat the steps starting with step 4 otherwise proceed to the next step.

17. Convert the value selected in step 14 to non-redundant form by a carry-look-ahead adder.

18. Add -C to the result of the previous step by a carry-look-ahead adder.

19. Determine the sign of the result of the previous step.

20. If the sign determined in the previous step is positive return the result of step 18 as AxB modulo C otherwise return the result of step 17 as AxB modulo C.

DEVICE FOR AND METHOD OF PREFORMING AN N-BIT MODULAR MULTIPLICATION IN APPROXIMATELY N/2 STEPS

FIELD OF THE INVENTION

This invention relates to a device for and a method of performing modular multiplication and more particularly to a device for and a method of performing modular multiplication of binary numbers in n/2 steps where n, which is any positive integer, represents the number of bits in the modulus.

BACKGROUND OF THE INVENTION

Devices for and methods of computing modular multiplication take two forms, serial and interleaved. In the serial method, the final product is determined before the modulo reduction is performed. In the interleaved method, a modulo reduction is performed after each partial product is generated. The serial method has proved to be difficult to implement. Serial-method devices that operate at speeds required by the public typically exceed the size constraint placed upon them. Serial-method devices that are within the size constraint typically do not meet the desired speed requirement.

In the highly competitive field of modular multiplication many scholars are seeking and proposing devices for and methods of performing modular multiplication that they consider to be the fastest. One of the most promising methods has been offered by C. K. Koc and C. Y. Hung in a paper entitled "Carry-Save Adders for Computing the Product AB Modulo N," published in *Electronics Letters*, Vol. 26, No. 13, 21 June 1990, pp. 899–900. In this paper Koc and Hung suggest an interleaved method that yields a modular multiplication of n-bit numbers in n steps. Their method is based on scanning the multiplier one bit at a time, modulo reducing the partial products, and performing a sign estimation on each partial product.

In the first cycle of the method proposed by Koc and Hung, the value of one bit of the multiplier is determined. If the bit is a one, the multiplicand is added to the partial product which initially is zero. If the bit is zero, zero is added to the partial product. The partial product is then modulo reduced by subtracting 2×modulus from the partial product. If the result is estimated to be negative, the result is discarded. If the result is estimated to be positive the result replaces the partial product. Next, the modulus is subtracted from the partial product. Once again, if the result is estimated to be negative, the result is discarded. If the result is estimated to be positive the result becomes the partial product. The cycle continues until all of the bits in the multiplier have been scanned. The partial product remains in redundant form until all of the bits of the multiplier have been used. The final partial product is then converted to non-redundant form via a carry-look-ahead adder. The modulus is subtracted from the final partial product one last time. If the result is positive, the result is returned as AB modulo N. If the result is negative, the final partial product is returned as AB modulo N.

The present invention is an improvement upon the Koc and Hung method. Where Koc and Hung achieve modular multiplication in n steps, the present invention achieves modular multiplication in n/2 steps. The present invention accomplishes this feat by doing a two-bit scan of the multiplier and performing an additional subtraction in order to modulo reduce larger partial products.

C. H. N. Forster, S. S. Dlay, and R. N. Gorgui-Naguib took the work of Koc and Hung one step further in their paper entitled, "Carry Delayed Save Adders for Computing the Product A.B Modulo N in $\log_2 N$ Steps," published in *Electronics Letters*, Vol. 26, No. 18, 30 August 1990. In this paper, Forster et. al. did not change the method proposed by Koc and Hung and did not recognize the improvement to the Koc and Hung method that the present inventor does. Forester et. al. only propose circuit changes that allow the method of Koc and Hung to run in parallel in order to improve performance.

Naofumi Takagi proposes the use of a two-bit scan of the multiplier in a paper entitled, "A Radix-4 Modular Multiplication Hardware Algorithm for Modular Exponentiation," published in *IEEE Transactions On Computers*, Vol. 41, No. 8, August 1992. But the method disclosed in this paper requires the use of a non-standard redundant number system which complicates the design of a modular multiplier. The present invention does not require this non-standard redundant number system.

U.S. Pat. Nos. 5,073,870 and 5,144,574, both entitled "Modular Multiplication Method and the System for Processing Data," disclose a modular multiplier that requires the transformation of the multiplicand to a non-standard form similar to the non-standard form proposed by Takagi above. The present invention does not require such a transformation.

The present invention improves upon the above identified devices and methods by disclosing a device and method which scans two bits of a multiplier per iteration, utilizes standard data representations, and requires one more addition per cycle in order to improve performance over the method of Koc and Hung by 100%.

SUMMARY OF THE INVENTION

The main objective of the present invention is to develop a device for and method of performing modular multiplication of binary numbers in the form $A \times B$ modulo C. C is n bits long, where n is any positive integer. The magnitude of B must be less than the magnitude of C but B can have a length equal to the length of C, and A can be any length (i.e., A can be less than, equal to, or greater than the length of C). This invention performs modular multiplication in n/2 steps while utilizing a standard redundant data representation.

The first step in the method is to load three variables A, B, and C into registers. Since C and multiples of C will be subtracted from partial products, the preferred embodiment loads $-C$ and negated multiples of C. These negative values are then added, using adders instead of subtractors, to emulate subtraction. The second step is to generate 2B, 3B, $-2C$, and $-4C$. The multiplicand A is then scanned two bits at a time from the most significant bit to the least significant bit. The value of these two bits is used to determine what variance of B (i.e., 0, B, 2B, or 3B) should be added to the partial product. A partial product register made up of two registers holds the partial products. The first register holds the save-bits and the second register holds the carry-bits.

The third step is to initialize the partial product registers to zero. In step 4, the appropriate variance of B is selected by a multiplexer based on the value of the two scanned bits of A. In step 5, the variance of B selected by the multiplexer is then added to the value contained in the partial product registers by a full-adder. In step 6 the contents of the partial product registers are added to −4C by a full adder. In step 7, the sign of the result of step 6 is estimated.

The sign estimation of the present invention is performed by doing a carry-look-ahead add of the seven most significant bits of the partial product registers. These seven bits consist of one sign bit, three overflow bits, and the three most significant bits of the substantive portion of the partial product. It is essential that at least three bits of the substantive portion of the partial product be used to estimate the sign. The present invention would not produce the correct answer otherwise. If the most significant bit of the result of step 7 is a zero then the result of step 6 is estimated to be positive. If the most significant bit of the result of step 7 is a one then the result of step 6 is estimated to be negative. The sign estimated in step 7 is then used in step 8 to select, by a multiplexer, either the result of step 6 or the result of step 5. If the sign is estimated to be positive then the result in step 6 is selected. If the sign is estimated to be negative, the result of step 5 is selected.

In step 9, −2C is added, by a full-adder, to the result selected in the previous step. The sign of the result of step 9 is then estimated in step 10 in the same manner as in step 7. In step 11, the result of step 9 is selected by a multiplexer if the sign in step 10 is estimated to be positive. Otherwise, the result of step 8 is selected.

In step 12, −C is added by a full-adder to the result of the previous step. The sign of the result of step 12 is then estimated in step 13 in the same manner as in step 7. In step 14, the result of step 12 is selected by a multiplexer if the sign in step 13 is estimated to be positive. Otherwise, the result of step 11 is selected.

Next, the two bits of A used to generate the partial product of step 14 are discarded. A number of activities occur in step 16. First it is determined whether there are any bits of A left in the register. If bits of A remain, the partial product of step 14 is loaded into the partial product registers and a second cycle of the method is performed. Each bit of the result of step 14 is loaded into the partial product registers at a bit location that is two bit positions more significant.

Step number 4 through step number 16 are repeated as long as bits of A remain. After it is determined that the register containing A is empty, the method of the present invention proceeds to step number 17. In step number 17, the result of step number 14 is converted from redundant form to non-redundant form. The result of step number 17 is then added to −C in step 18. In step number 19, the sign of the result of step number 18 is determined. If the sign is determined to be positive, the result of step number 18 is transmitted in step 20 as A×B modulo C. If the sign is determined to be negative, the result of step number 17 is transmitted in step 20 as A×B modulo C.

The device of the present invention has a first register for storing the binary multiplier A, a second register for storing the multiplicand B, and a third register for storing the modulus C. There are numerous ways to store these values. Since the n-bit modulus C will be subtracted from the partial products, the preferred embodiment stores −C in two's complement form with one sign bit and three overflow bits. The values 2B, 3B, −4C, and −2C are generated before the computation is conducted. A selecting means is used to select either 0, B, 2B, or 3B based on the value of the two scanned bits of A.

The partial product register of the present invention is actually comprised of two identical registers, a first partial product register for storing the save bits, and a second partial product register for storing the carry bits. There is a first row of full-adders for adding the partial product to the value selected by the selecting means. There is also a second row of full-adders for adding −4C to the result of the addition performed using the first row of full-adders.

A first sign estimating means is used to estimate the result of adding −4C. If the sign of the result is estimated to be positive, the result is passed as the partial product. If the result is estimated to be negative, the output of the first row of full-adders is passed as the partial product.

The present invention also contains a third row of full-adders for adding −2C to the output of the first sign-estimating means. A second sign estimating means is used to estimate the sign of the result of adding −2C. If the sign is estimated to be positive, the output of the third row of full-adders is passed as the partial product. If the sign is estimated to be negative, the output of the first sign-estimating means is passed as the partial product.

The present invention also contains a fourth row of full-adders for adding −C to the output of the second sign-estimating means. A third sign estimating means is used to estimate the sign of the result of adding −C. If the sign is estimated to be positive, the output of the fourth row of full-adders is passed as the partial product. If the sign is estimated to be negative, the output of the second sign-estimating means is passed as the partial product.

A transmitting means transmits the output of the third sign-estimating means to the first partial product register and the second partial product register. Each bit is transmitted to a bit position that is two bit positions more significant than the bit position that bit occupied in the third sign-estimating means.

A first carry-look-ahead adder is used to convert the last partial product of the third sign-estimating means from redundant form to non-redundant form. A second carry-look-ahead adder is used to add −C to the output of the first carry-look-ahead adder. A sign-determining means determines the sign of the result of adding −C. If the sign of the result is positive, the output of the second carry-look-ahead adder is transmitted as A×B modulo C. If the sign of the result is negative, the output of the first carry-look-ahead adder is transmitted as A×B modulo C.

It is known by the inventor that the present invention can be modified to scan the multiplier by any multiple of bits. A 3-bit scan approach would outperform a 2-bit scan approach by approximately 50%. A 3-bit scan approach would require one additional modulo reduction of the partial product by −8C and generation of 4B, 5B, 6B, and 7B as compared to the 2-bit scan approach. The number of substantive bits used in the 3-bit sign-estimation after each modulo reduction would have to be increased over the number of bits used in the 2-bit sign-estimation. There is a diminishing return as the number of scan bits increase. A 4-bit scan would only outperform a 3-bit scan by approximately 33%. A 4-bit scan would also require one additional modulo reduction of the partial product by −16C and the generation of 8B to 15B as compared to the 3-bit scan approach. The number of substantive bits used in the 4-bit sign-estimation would also have to increase from the number of bits used in the 3-bit sign estimation. After weighing performance versus circuit complexity, the inventor believes that the 2-bit scan approach is the best choice.

BRIEF DESCRIPTION OF THE DRAWINGS

FIG. 1 is a flow chart of the method of performing $A \times B$ modulo C in n/2 steps.

DETAILED DESCRIPTION

The present invention is a device for and method of performing modular multiplication of the form $A \times B$ modulo C, where A denotes a binary multiplier, B denotes a binary multiplicand, and C denotes an n-bit binary modulus. The usefulness of the present invention lies in the fact that modular multiplication can be performed in approximately n/2 steps. The multiplier A can be any length. The magnitude of the multiplier B must be less than the magnitude of the modulus C. But B may have a length equal to the length of C.

The Method of the Present Invention

FIG. 1 illustrates the method of the present invention. The first step in the method is to load the three variables A, B, and C into individual registers. The preferred method is to use full-adders instead of full-subtractors. Therefore, instead of loading C into a register, $-C$ is loaded. Subtracting C can now be emulated by adding $-C$. Although the preferred embodiment of the present invention uses full-adders, the scope of the present invention is thought to be broad enough to include the use of full-subtractors. There are many ways to store B and C. The preferred way is to pad B with zeros in the most significant bit positions in order to make B equivalent in length to C if necessary. One sign bit and three overflow bits are also added to the most significant four bit positions of both B and C. The multiplier A is loaded as is unless A contains an odd number of bits. If A contains an odd number of bits, A is padded with one extra zero in the most significant bit position. The values A, B, and C are required to be positive numbers. The two's complement form is used to represent negative variables such as $-C$ and negative partial products.

The present invention realizes some of its performance improvement by having all necessary variables available when required. The second step in the method is to generate all of these necessary variables. These variables consist of 2B, 3B, $-2C$, and $-4C$. Modular multiplication is basically a series of modular additions where the number of additions is determined by the multiplier. For example $2 \times 3$ is equivalent to $2+2+2$. The method of the present invention scans the multiplier A two bits at a time. The preferred embodiment scans A from the most significant bit to the least significant bit. However, the scope of the present invention is thought to be broad enough to include any order of two-bit scanning. The only requirement for these other scanning orders is that the weight associated with the bits being scanned be taken into account when determining the weight to be given to resulting partial products. The value of the two bits scanned is then used to determine which variance of B (i.e., 0, B, 2B, or 3B) should be added to the partial product. These variances are all the results possible from the multiplication of B by a two-bit number.

Another way the present invention achieves a performance improvement is by leaving the result of all but the last two additions in redundant form. Redundant form is a form where each bit of a number is represented by two bits. One of these two bits is a carry bit and the other bit is a save bit. Non-redundant form is a form where the carry-bits are added to the save bits of the next most significant bit position so that each bit position is represented by one bit (i.e., the save bit). However, the last bit in non-redundant form is represented by two bits (i.e., a save bit and the final carry bit). Therefore, the partial product register is actually made up of two registers, one for holding the save-bits and one for holding the carry-bits. The third step is to initialize the partial product registers to zero.

In step 4, the appropriate variance of B is selected by a multiplexer. The selection is based on the value of the two scanned bits of A. If the two bits of A have the value 0, 1, 2, or 3, then 0, B, 2B, or 3B is selected respectively. Multiplication is emulated by this selection process. Here, B is being multiplied by two bits of A at a time. In step 5, the variance of B selected by the multiplexer is then added to the value contained in the partial product registers by a full-adder. A full-adder is a device that adds three inputs (A, B, and Carry-in) to produce two outputs (Carry-out and Save-out). A full-adder is sometimes referred to as a carry-save-adder.

The performance improvement realized by the present invention mainly comes from multiplying B two bits at a time and modulo reducing each partial product. Koc and Hung disclosed, in an above identified paper, a method of performing modular multiplication by multiplying B one bit at a time and modulo reducing the partial products. Their method consisted essentially of adding either zero or B to the partial product based on the value of the one bit of A, subtracting $2 \times$ modulus from the result of the addition, estimating the sign of the result of the subtraction, passing the result of the subtraction if it is estimated to be positive otherwise passing the result of the previous addition, subtracting the modulus from the value passed, repeating the passing steps, discarding the one bit of A, repeating all of these steps until no bit of A remains, and performing one last modulo reduction using the modulus. Koc and Hung mathematically determined that no errors would occur from overflows if three bits were used for sign-estimation. The present invention improves upon the work of Koc and Hung by performing multiplication two bits at a time instead of one bit at a time, modulo reducing each partial products, and using seven bits for sign-estimation. The method of the present invention essentially consists of adding 0, B, 2B, or 3B to the partial product register based on the value of two bits of A, subtracting $4 \times$ modulus, estimating the sign of the result of the subtraction, passing the result of the subtraction if it is estimated to be positive otherwise passing the result of the previous addition, discarding the two bits of A, repeating these steps with $2 \times$ modulus, repeating these steps again with the modulus, repeating all of these steps until no bits of A remain, and performing one last modulo reduction with the modulus. The inventor mathematically proved that no errors occur due to overflow if at least seven of the most significant bits of the partial product are used for sign-estimation (i.e., one sign bit, three overflow bits, and the three most significant bits of the substantive portion of the partial product). The result is a method of performing modular multiplication of the form A×B modulo C that outperforms the method of Koc and Hung by approximately 100%. The improvement comes mainly from doubling the number of bits used per multiplication step. Step 6 is the first of these identified subtractions (actually the first subtraction is an addition of a negative number). The contents of the partial product registers are added to −4C by a full adder.

In step 7, the sign of the result of step 6 is estimated. Sign-estimation of the present invention is performed by doing a carry-look-ahead add of the seven most significant bits of the partial product registers (i.e., transforming the seven most significant carry-bits and save-bits of the partial product registers into non-redundant form). If the most significant bit of the result of step 7 is a zero then the result of step 6 is estimated to be positive. If the most significant bit of the result of step 7 is a one then the result of step 6 is estimated to be negative. Not having to do a carry-look-ahead add on the entire contents of the partial product registers results in a significant time savings. The time saved is directly proportional to the number of bits in the partial product register divided by the seven bits used to estimate the sign. Although similar to the way Koc and Hung perform sign estimation in an above identified paper, the sign estimation technique of the present invention is critically different in that seven bits were mathematically determined to be the minimum number of bits necessary to allow the method of the present invention to function properly. The method proposed by Koc and Hung suggests performing sign-estimation with the three most significant bits of the partial product registers. The three-bit sign-estimation method of Koc and Hung would not work in the present invention.

The sign estimated in step 7 is then used in step 8 to select, by a multiplexer, either the result of step 6 or the result of step 5. If the sign is estimated to be positive then the result in step 6 (i.e., the result of adding −4C) is selected. If the sign is estimated to be negative, disregard the result of step 6 and select the result of step 5.

A second stage of modulo reduction of the partial product continues in step 9 where −2C is added, by a full-adder, to the result selected in the previous step. The sign of the result of step 9 is then estimated in step 10 in the same manner as in step 7. In step 11, the result of step 9 is selected by a multiplexer if the sign in step 10 is estimated to be positive. Otherwise, the result of step 8 is selected.

A third stage of modulo reduction of the partial product is conducted in step 12 where −C is added by a full-adder to the result selected in the previous step. The sign of the result of step 12 is then estimated in step 13 in the same manner as in step 7. In step 14, the result of step 12 is selected by a multiplexer if the sign in step 13 is estimated to be positive. Otherwise, the result of step 11 is selected.

One cycle of the method of the present invention has been completed. Next, the two bits of A used to generate the partial product of step 14 are discarded. This is accomplished in step 15 by shifting the contents of the register containing A two significant bits. A number of activities occur in step 16. First it is determined whether or not there are any bits of A left in the register. This can be accomplished by initially noting how many bits of A were stored in the register and counting the number of two-bit shifts of the contents of that register. When the number of two-bit shifts exceeds one-half of the number of bits of A, the register containing A is empty. If it is determined that bits of A remain in the register, the partial product of step 14 is loaded into the partial product registers and a second cycle of the method is performed. Since the second cycle uses two bits of A that are two positions less significant than those used in the first cycle, the weight of the result of step 14 is adjusted accordingly by loading the result of step 14 into the partial product registers at bit locations that are two bit positions more significant. Essentially a multiplication by four is being accomplished by this shift of the result of step 14 by two significant positions. The steps of the method starting with step 4 are then repeated.

Step number 4 through step number 16 are repeated as long as bits of A remain (if step 4 is repeated it will be designated step 4a etc.). That is, multiplication continues until the multiplicand has been multiplied by every bit of the multiplier. The modulo reduction occurs after the generation of each partial product. After it is determined that the register containing A is empty, the method of the present invention proceeds to step number 17. In step number 17, the result of step number 14 is converted from redundant form to non-redundant form. This is accomplished by adding all of the carry-bits and all of the save-bits of the result of step 14 by a carry-look-ahead adder. The result of step number 17 is then modulo reduced by adding −C by a carry-look-ahead adder in step 18. A carry-look-ahead adder is used in step number 18 so that the non-redundant form of the result of step number 17 is preserved. In step number 19, the sign of the result of step number 18 is determined. The determination in step number 19 is not an estimate because the sign of a number in non-redundant form is determined by the value of the most significant bit. If the most significant bit is a 0 the sign is positive. If the most significant bit is a 1 the sign is negative. If the sign is positive, step number 20 transmitts t the result of step number 18 as A×B modulo C. If the sign is negative, step number 20 transmitts the result of step number 17 as A×B modulo C. The following non-trivial example is intended to resolve any unintended ambiguities.

An Example of the Present Invention

The following example illustrates how the method of the present invention would compute 11×53 modulo 59 (the answer is $52_{10}=11001_2$). Using the form A×B modulo C it is determined that $A=11_{10}=1011_2$, $B=53_{10}=110101_2$, and $C=59_{10}=111011_2$.

In step 1, A, B, −C are loaded into individual registers with the result that the first register contains 1011 (A), the second register contains 0000110101 (one sign bit, 3 overflow bits, and B), and the third register contains 1111000101 (−C in 2's complement form).

In step 2, the values of 2B, 3B, −2C, and −4C are generated, where 2B=0001101010, 3B=0010011111, −2C=1110001010, and −4C=1100010100.

In step 3, the partial product registers are initialized to zero so that the first partial product register (ppc)=0000000000 (carry bits) and the second partial product register (pps)=0000000000 (save bits).

In step 4, it is determined that the two most significant bits of A (1011) are $10_2=2_{10}$. Therefore, 2B is selected. In step 5, the value 2B is added to the partial product registers, where ppc=0000000000, pps=0000000000, and 2B=0001101010. The result is that Cout=0000000000 and Sout=0001101010.

In step 6, the value −4C is added to the result of step 5, where Cin=0000000000, Sin=0001101010, and −4C=1100010100. The result is that Cout=0000000000 and Sout=1101111110.

In step 7, the sign of the result of step 6 is estimated by adding the seven most significant carry bits and save bits and looking at the resulting sign bit (the most significant bit), where Cin=0000000 and Sin=1101111. The result is 1101111. Since the sign bit is a 1, the sign of the result of the previous step is estimated to be negative. Therefore, in step 8, the result of step 5 is selected.

In step 9, the value −2C is added to the result selected in the previous step, where Cin=0000000000, Sin=0001101010, and −2C=1110001010. The result is that Cout=0000010100 and Sout=1111100000.

In step 10, the sign of the result of the previous step is estimated, where Cin=0000010 and Sin=1111100. The result is 1111110. Since the sign bit is a 1, the sign of the result of step 9 is estimated to be negative.

In step 11, since the sign was estimated to be negative the result selected in step 8 is selected.

In step 12, the value −C is added to the result selected in the previous step, where Cin=0000000000, Sin=0001101010, and −C=1111000101. The result is that Cout=0010000000 and Sout=1110101111.

In step 13, the sign of the result of the previous step is estimated, where Cin=0010000 and Sin=1110101. The result is 0000101. Since the sign bit is a 0, the sign of the result in step 12 is estimated to be positive.

In step 14, since the sign was estimated to be positive in step 14 the result of step 12 is selected.

In step 15, the contents of the register holding A (1011) is shifted two significant positions (11). Therefore, in step 16, the value selected in step 14 is loaded into the partial product registers at bit positions that are two positions more significant. Zeros are loaded into the two least significant bit positions of the partial product registers. Therefore, ppc=1000000000 and pps=1010111100. The steps starting with step 4 are repeated.

In step 4a. the two most significant bits of A (11) are $11_2=3_{10}$. Therefore, 3B is selected. In step 5a, the value selected in the previous step is added to the partial product registers, where ppc=1000000000, pps=1010111100, and 3B=0010011111. The result is that Cout=0100111000 and Sout=0000100011.

In step 6a, the value −4C is added to the result of step 5a, where Cin=0100111000, Sin=0000100011, and −4C=1100010100. The result is that Cout=1001100000 and Sout=1000001111. In step 7a, the sign of the result of step 6a is estimated, where Cin=1001100 and Sin=1000001. The result is 0001101. Since the sign bit is a 0, the sign of the result of step 6a is estimated to be positive. Therefore, in step 8a, the result of step 6a is selected.

In step 9a, the value −2C is added to the result selected in the previous step, where Cin=1001100000, Sin=1000001111, and −2C=1110001010. The result is that Cout=0000010100 and Sout=1111100101. In step 10a, the sign of the result of the previous step is estimated, where Cin=0000010 and Sin=1111100. The result is 1111110. Since the sign bit is a 1, the sign of the result of step 9a is estimated to be negative. Therefore, in step 11a, the result of step 8a is selected.

In step 12a, the value −C is added to the result selected in the previous step, where Cin=1001100000, Sin=1000001111, and −C=1111000101. The result is that Cout=0010001010 and Sout=1110101010. In step 13a, the sign of the result of the previous step is estimated, where Cin=0010001 and Sin=1110101. The result is 0000110. Since the sign bit is a 0, the sign of the result of step 12a is estimated to be positive. Therefore, in step 14a, the result of step 12a is selected.

In step 15a, the contents of the register containing A (11) is shifted two significant positions. The register that contained A is now empty. Therefore, proceed to step 17.

In step 17, the result selected in step 14a is converted to non-redundant form, where Cin=0010001010 and Sin=1110101010. The result is 0000110100. In step 18, the value −C is added to the result of the previous step, where 0000110100 plus −C (1111000101) equals 1111111001. In step 19, the sign is determined to be negative. Therefore, in step 20 return the result of step 17 as A×B modulo C (i.e., $110100_2=52_{10}$, the correct answer to 11×53 modulo 59).

The Device of the Present Invention

Figure 2:
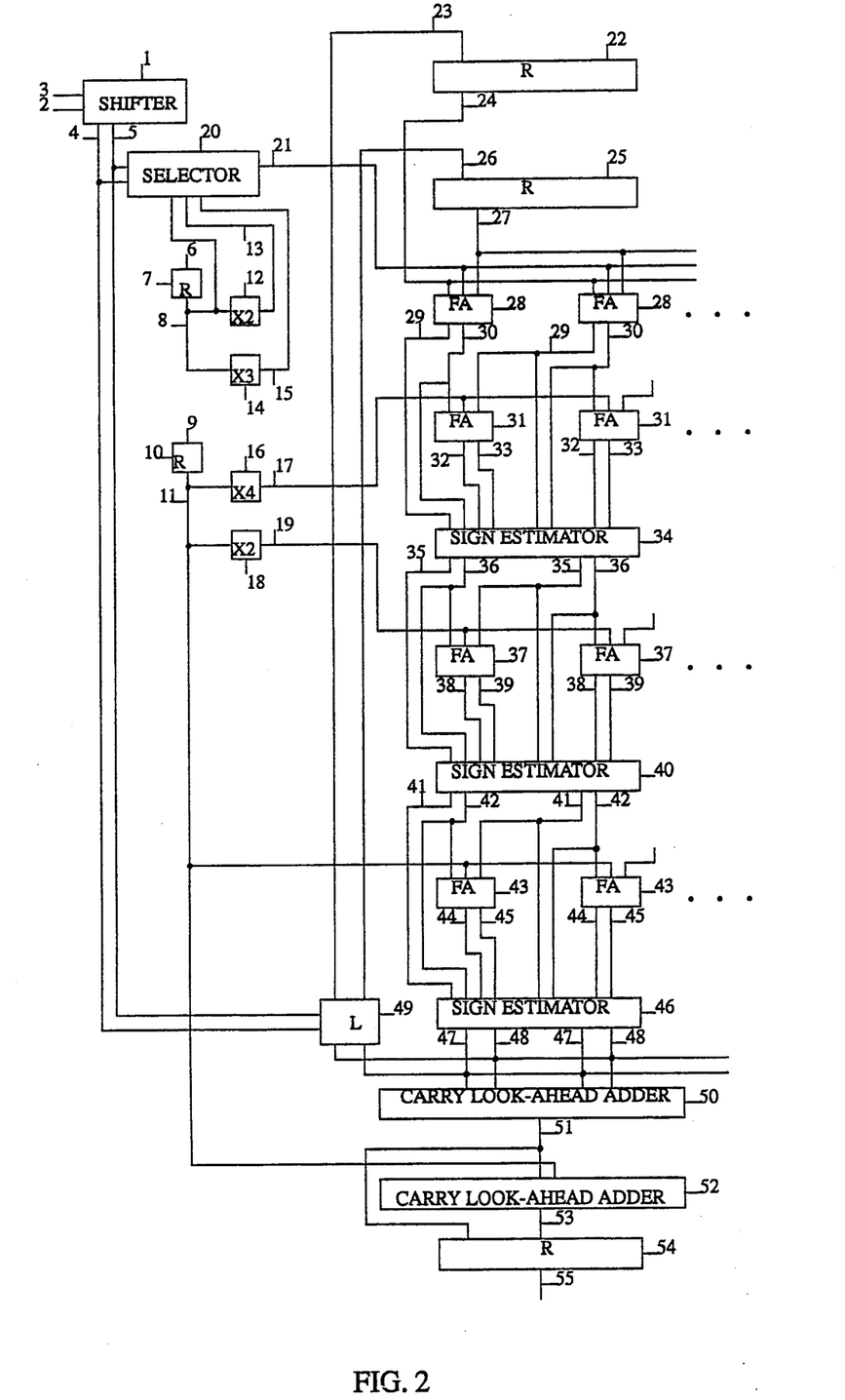
FIG. 2 is a schematic of a device for performing $A \times B$ modulo C in n/2 steps.

FIG. 2 illustrates a schematic of the device of the present invention. A first register 1 is used to store the binary multiplier A. A first input 2 is used to load A. The multiplier A can be loaded in parallel or serial fashion. The multiplier A is a binary number of any length. If the number of bits in A is odd, A is padded with a zero in the most significant bit position. The padding with a zero is done in order to allow A to be scanned two bits at a time without having to check if only one bit of A is present. A second input 3 is used to shift the contents of the first register 1. The first register 1 has a first output 4 and a second output 5. The first output 4 is connected to the most significant bit position of the first register 1. The present invention uses the convention that the left-most bit position of a register is the most significant bit and the right-most bit position of a register is the least significant bit. Therefore, the first output 4 is connected to the most significant bit position of the first register 1. The second output 5 is connected to the next most significant bit position of the first register 1 (i.e., the bit position second from the left).

After A is loaded into the first register 1, the two most significant bits of A appear at the first output 4 and the second output 5 respectively. To scan the contents of A the contents of the first register 1 are shifted a significant position (i.e., one position to the left) upon the application of a clock signal to the second input 3. Upon the application of a clock signal the contents of the first register 1 are shifted one position to the left resulting in the most significant bit being discarded. To scan the contents of A two bits at a time, as intended in the present invention, two clock signals are applied at a time to the second input 3. When two clock signals are applied to the second input 3, the two most significant bits of A are discarded and the next two most significant bits of A appear at the first output 4 and the second output 5 respectively. Clock signals are applied two at a time, at the appropriate time, until the entire contents of A have appeared at the first output 4 and the second output 5 of the first register 1.

A second register 6 is used to store the multiplicand B. The magnitude of B must be less than the magnitude of the modulus C in order for the present invention to work. But B can be equal in length to the length of C. If B has a length less than the length of C, B is padded with leading zeros in order to make these two lengths equivalent. B can be stored as is but the preferred embodiment stores B with one sign bit, three overflow bits, and the bits of B padded with enough leading zeros in order to make B equivalent in bit-length to C if necessary. The sign bit occupies the most significant bit position of the second register 6. The three overflow bits occupy the next three most significant bit positions of the second register 6. The present invention will work if more than three overflow bits are used. The bits of B occupy the least significant bit positions of the second register 6. The registers that remain to be defined follow the bit-convention of the second register 6. The second register 6 has an input 7 for loading the sign bit, the three overflow bits and the multiplicand B padded with leading zeros. In the present invention, B must be a positive number. Negative partial products are represented in two's complement form. The overflow bits in the second register 6 are all zero. B can be loaded serially or in parallel. An output bus 8 is connected to the second register 6 so that every bit stored in the second register 6 (i.e., the sign bit, the three overflow bits, and the bits of B padded with leading zeros in order to equal the bit-length of C) appears at the output bus 8.

A third register 9 is used to store the modulus C. C is n bits in length. Since C will be subtracted from the partial products generated in computing A×B modulo C and since adders are used in the present invention instead of subtractors, −C will actually be stored in the third register 9 in two's complement form along with a sign bit and three overflow bits in the same manner as in the second register 6. Note that the two's complement is performed on the entire value stored which includes the sign bit, the three overflow bits and the n bits of C. Therefore, the sign bit and the overflow bits are all one. The third register has an input 10 for loading −C. An output bus 11 is connected to the third register 9 so that every bit stored in the third register 9 appears at the output bus 11.

Some of the improved performance of the present invention derives from the fact that all of the values needed to perform the function of the present invention are available when required. These values (i.e., 2B, 3B, −4C, and −2C) are generated before the computation is conducted. The value 2B is generated in a first generating means 12. The first generating means 12 is connected to the output bus 8 of the second register 6. The first generating means 12 also has an output bus 13. The simplest device that can generate 2B is a register connected so that the contents of the second register 6 (including the sign bit and the overflow bits) appearing at the output bus 8 are loaded into the register so that each bit in the second register 6 now occupies a bit position in the register that is one bit more significant (i.e., B is shifted one position to the left). The result of shifting a number one significant position is to multiply that number by the weight of one position of that number. Since the weight of a binary position is two, each left shift of a binary number results in the multiplication of that number by a factor of two. The output bus 13 is connected to the register so that every bit of 2B (including the sign bit and the overflow bits) stored in the register appears at the output bus 13.

A second generating means 14 is used to generate the value 3B. The second generating means 14 is connected to the output bus 8 of the second register 6 for receiving B. The second generating means also has an output bus 15 for transmitting 3B. Since 3B is not an even multiple of B, the second generating means 14 is more complicated than the first generating means 12. One device that can generate 3B would contain a register and an adder. The register would be as described in the first generating means (i.e., a register for shifting the contents of the second register 6 one significant position in order to generate 2B). The register would have an input bus connected to the output bus 8 of the second register 6 and an output bus for transmitting 2B. An adder would add 2B generated by the register with B appearing at the output 8 of the second register 6 in order to generate 3B. The adder would have a first input bus connected to the output bus of the register used to generate 2B, a second input bus connected to the output bus 8 of the second register 6, and an output bus such as output bus 15 of the second generating means 14 for transmitting 3B.

A third generating means 16 is used to generate the value −4C. This value is an even multiple of −C which is stored in the third register 9. Therefore, a device that can generate −4C can be a register as described for the first generating means 12 with one difference. The one difference would be that instead of shifting the data received by one significant bit position the data received would be shifted by two significant bit positions. The result is a multiplication by 4. A device that can generate −4C could be a register having an input bus connected to the output bus 11 of the third register 9 in a fashion so that the contents of the third register 9 (−C) are shifted two significant positions. The device would also have an output bus such as output bus 17 of the third generating means for transmitting −4C.

A fourth generating means 18 is used to generate the value −2C. This value is an even multiple of −C which is stored in the third register 9. A device that can generate −2C can be a register as described for the first generating means 12. Therefore, a device that can generate −2C could be a register having an input bus connected to the output bus 11 of the third register 9 so that the contents of the third register 9 (−C) is shifted one significant bit position. The device would also have an output bus such as the output bus 19 of the fourth generating means for transmitting −2C.

A selecting means 20 is used to select either 0, B, 2B, or 3B based on the value of the two scanned bits of A. The selecting means performs the function of looking at two bits of A and multiplying B by the value of the two bits. No actual multiplication takes place. All possible values of such a multiplication (i.e., 0, B, 2B, and 3B) already exist or have already been generated. The selecting means only has to determine the value of the two bits and select the appropriate value which represents the result of the multiplication if a multiplication had actually occurred. The selecting means 20 is connected to the first output 4 and the second output 5 of the first register 1 for receiving two bits of A. The selecting means 20 is also connected to the output bus 8 of the second register for receiving B, the output bus 13 of the first generating means for receiving 2B, and the output bus 15 of the second generating means for receiving 3B. The selecting means does not have to receive the value zero. Zero is a value that can easily be generated internally by storing zero. Storing zero amounts to no more than providing an appropriate number of connections to ground. A multiplexer can then be used to select one of the four desired values (i.e., 0, B, 2B, or 3B) based on the value to the two bits of A. The multiplexer would also have an output bus such as output bus 21 of the selecting means 20 for transmitting the value selected.

The computational portion of the present invention contains a partial product register. The speed of the computation is improved if the partial products generated during the computation are in redundant form instead of non-redundant for. Redundant form is a form where each bit of a number is represented by a carry bit and a save bit. Non-redundant form is a form where each bit of a number is represented by one bit (a save bit) except the last bit which is represented by a save bit and a carry bit. The partial product register of the present invention is actually comprised of two identical registers. The first partial product register 22 is used for storing the save bits of the partial products. The second partial product register 25 is used to store the carry bits of the partial products. The first partial product register 22 has an input bus 23 for initialization and receiving the save bits of partial products generated after each computational cycle. The first partial product register 22 also has an output bus 24 for transmitting the save bits of a partial product for use in a subsequent computational cycle. The length of the first partial product register 22 and the second partial product register 25 is equal to the length of the second register 6 (i.e., one sign bit, at least three overflow bits, and n bits of the value of interest). The second partial product register 25 has an input bus 26 for initialization and receiving the carry bits of partial products generated after each computational cycle. The second partial product register 25 also has an output bus 27 for transmitting the carry bits of a partial product for use in a subsequent computational cycle. The first partial product register 22 and the second partial product register 25 are initialized to all zeros at the beginning of the computation.

The present invention has a first row of full-adders 28 for adding the partial product contained in the first partial product register 22 and the second partial product register 25 to the value selected by the selecting means 20. The result is a partial product that represents the multiplication of B by two bits of A. Each full-adder 28 in the first row has three inputs (i.e., A, B, and Carry-in) and two outputs (i.e., Carry-out 29 and Save-out 30). Each full adder 28 adds the inputs together to produce the appropriate outputs. A full-adder is sometimes referred to as a carry-save-adder. The first row of full-adders 28 consists of one full-adder for each bit position in the partial product registers (22, 25) and each bit position of the output bus 21 of the selecting means. The first input (A) of each full-adder 28 is connected to the corresponding save-bit of the output bus 24 of the first partial product register 22. The second input (B) of each full-adder 28 is connected to the corresponding bit in the output bus 21 of the selecting means 20. The third input (Carry-in) of each full-adder 28 is connected to a carry-bit in the output bus 27 of the second partial product register 25 that is one bit position less significant than the bit position of the full-adder 28 that is receiving this carry-bit. What this means is that the save bits of the partial product register feed straight down to full-adders 28, the carry bits of the partial product register feed down to full-adders 28 that are one position to the left, and the outputs of the selecting means 20 feed into corresponding inputs of the full-adders 28. This is done in order to add only bits of equivalent weight.

The present invention also contains a second row of full-adders 31 for adding $-4C$ from the third generating means 16 to the result of the addition performed using the first row of full-adders 28. Adding $-4C$ is the first modulo reduction of the partial product. Each full-adder 31 in the second row has three inputs (i.e., A, B, and Carry-in) and two outputs (i.e., Carry-out 32 and Save-out 33). The second row of full-adders 31 consists of one full-adder for each bit position in the first row of full-adders 28 and for each bit position in the output bus 17 of the third generating means 16. The first input (A) of each full-adder 31 is connected to the corresponding Save-out 30 of the first row of full-adders 28. The second input (B) of each full-adder 31 is connected to the corresponding bit in the output bus 17 of the third generating means 16. The third input (Carry-in) of each full-adder 31 is connected to the Carry-out 29 bit of the first row full-adders 28 that is one bit position less significant than the bit position of the full-adder 31 that is receiving this carry-bit. What this means is that the save bits of the first row of full-adders 28 feed straight down to the save bits of the second row of full-adders 31, the carry bits of the first row of full-adders 28 feed down to full-adders 31 in the second row that are one bit position to the left, and the outputs of the third generating means 16 feed into corresponding inputs of the second row of full adders 31. Once again, this is done in order to add only bits of equivalent weight.

A first sign estimating means 34 is used to estimate the sign of the first modulo reduction of a partial product. The first sign estimating means 34 is connected to Carry-outs 32 of the second row of full-adders 31, Save-outs 33 of the second row of full-adders 31, the Carry-outs 29 of the first row of full-adders 28, and the Save-outs 30 of the first row of full adders 28. A seven-stage adder can be used to convert the redundant form of the seven most significant bit positions of the second row of full-adders 31. The seven bits of interest are the sign bit, the three overflow bits, and the three most significant bits of the substantive portion of the partial product. The present invention requires that at least three most significant bits of the substantive portion of the partial product be added. Therefore, if four overflow bits are used, then eight bits must be added to estimate the sign. The other sign-estimating means of the present invention follow this same convention. A comparator can then be used to compare the most significant bit of the non-redundant form to a one and a zero. A multiplexer can then be used to transmit the Carry-outs 32 and the Save-outs 33 of the second row of full-adders 31 from Carry-outs 35 and Save-outs 36 of the first sign-estimating means 34 when the most significant bit of the non-redundant form generated is a 0 (which indicates that the sign was estimated to be positive and that the modulo reduction can be accepted). If the most significant bit of the non-redundant form generated is a 1 (which indicates that the sign was estimated to be negative and that the modulo reduction should be discarded) the multiplexer then transmits the Carry-outs 29 and the Save-outs 30 of the first row of full-adders 28 from the Carry-outs 35 and the Save-outs 36 from the first sign-estimating means 34.

The present invention also contains a third row of full-adders 37 for adding $-2C$ from the fourth generating means 18 to the outputs of the first sign-estimating means 34. Adding $-2C$ is the second modulo reduction of the partial product. Each full-adder 37 in the third row has three inputs (i.e., A, B, and Carry-in) and two outputs (i.e., Carry-out 38 and Save-out 39). The third row of full-adders 37 consists of one full-adder for each bit position in the first sign-estimating means 34 and for each bit position in the output bus 19 of the fourth generating means 18. The first input (A) of each full-adder 37 is connected to the corresponding Save-out 36 of the first sign-estimating means 34. The second input (B) of each full-adder 37 is connected to the corresponding bit in the output bus 19 of the fourth generating means 18. The third input (Carry-in) of each full-adder 37 is connected to the Carry-out 35 bit of the first sign-estimating means 34 that is one bit position less significant than the bit position of the full-adder 37 that is receiving this carry-bit. What this means is that the save bits of the first sign-estimating means 34 feed straight down to the save bits of the third row of full-adders 37, the carry bits of the first sign-estimating means 34 feed down to full-adders 37 in the third row that are one bit position to the left, and the outputs of the fourth generating means 18 feed into corresponding inputs to the third row of full adders 37.

A second sign estimating means 40 is used to estimate the sign of the second modulo reduction of a partial product. The second sign estimating means 40 is connected to Carry-outs 38 of the third row of full-adders 37, Save-outs 39 of the third row of full-adders 37, the Carry-outs 35 of the first sign-estimating means 34, and the Save-outs 36 of the first sign-estimating means 34. A seven-stage adder can be used to convert the redundant form of the seven most significant bit positions of the third row of full-adders 37. Once again, the present invention requires that at least the three most significant bits of the substantive portion of the partial product register be used to estimate the sign (i.e., seven bits are used when there is one sign bit and three overflow bits). If one sign bit and four overflow bits are used then eight bits would be used to estimate the sign. A comparator can then be used to compare the most significant bit of the non-redundant form to a one and a zero. A multiplexer can then be used to transmit the Carry-outs 38 and the Save-outs 39 of the third row of full-adders 37 from Carry-outs 41 and Save-outs 42 of the second sign-estimating means 40 when the most significant bit of the non-redundant form generated is a 0 (which indicates that the sign was estimated to be positive and that the modulo reduction can be accepted). If the most significant bit of the non-redundant form generated is a 1 (which indicates that the sign was estimated to be negative and that the modulo reduction should be discarded) the multiplexer then transmits the Carry-outs 35 and the Save-outs 36 of the first sign-estimating means 34 from the Carry-outs 41 and the Save-outs 42 of the second sign-estimating means.

The present invention also contains a fourth row of full-adders 43 for adding $-C$ from the third register 9 to the outputs of the second sign-estimating means 40. Adding $-C$ is the third and last modulo reduction of the partial product per cycle in the computation. Each full-adder 43 in the fourth row has three inputs (i.e., A, B, and Carry-in) and two outputs (i.e., Carry-out 44 and Save-out 45). The fourth row of full-adders consists of one full-adder 43 for each bit position in the second sign-estimating means 40 and for each bit position in the output bus 11 of the third register 9. The first input (A) of each full-adder 43 is connected to the corresponding Save-out 42 of the second sign-estimating means 40. The second input (B) of each full-adder 43 is connected to the corresponding bit in the output bus 11 of the third register 9. The third input (Carry-in) of each full-adder 43 is connected to the Carry-out 41 bit of the second sign-estimating means 40 that is one bit position less significant than the bit position of the full-adder 43 that is receiving this carry-bit. What this means is that the save bits of the second sign-estimating means 40 feed straight down to the save bits of the fourth row of full-adders 43, the carry bits of the second sign-estimating means 40 feed down to full-adders 43 in the fourth row that are one bit position to the left, and the outputs of the third register 9 feed into corresponding inputs of the fourth row of full adders 43.

A third sign estimating means 46 is used to determine if the result of the third modulo reduction of a partial product is positive or negative. The third sign estimating means 46 is connected to Carry-outs 44 of the fourth row of full-adders 43, Save-outs 45 of the fourth row of full-adders 43, the Carry-outs 41 of the second sign-estimating means 40, and the Save-outs 42 of the second sign-estimating means 40. Seven full-adders can be used to convert the redundant form of the seven most significant bit positions of the fourth row of full-adders 43 (when one sign bit and three overflow bits are used). The present invention requires that at least three most significant bits of the substantive portion of the partial product be used to estimate sign. If one sign bit and four overflow bits are used then eight adders are needed to estimate sign. A comparator can then be used to compare the most significant bit of the non-redundant form to a one and a zero. A multiplexer can then be used to transmit the Carry-outs 44 and the Save-outs 45 of the fourth row of full-adders adders 43 from Carry-outs 47 and Save-outs 48 of the third sign-estimating means 46 when the most significant bit of the non-redundant form generated is a 0 (which indicates that the sign was estimated to be positive and that the modulo reduction can be accepted). If the most significant bit of the non-redundant form generated is a 1 (which indicates that the sign was estimated to be negative and that the modulo reduction should be discarded) the multiplexer then transmits the Carry-outs 41 and the Save-outs 42 of the second sign-estimating means 40 from the Carry-outs 47 and the Save-outs 48 of the third sign-estimating means.

The present invention contains a transmitting means 49 for transmitting the Carry-outs 47 and the Save-outs 48 of the third sign-estimating means to the input bus 26 of the second partial product register 25 and the input bus 23 of the first partial product register 22 respectively. The transmitted bits are transmitted to bit positions in the partial product registers (22, 25) that are two bit positions more significant than the bit positions those bits occupied in the third sign-estimating means 46. Essentially this accomplishes the task of properly weighing the partial product of one computational cycle. Since the bits of A are scanned two bits at a time from the most significant bit to the least significant bit, the result of a computational cycle has a weight that is four times (i.e., two positions more significant than) that of the partial product that will be computed on the next computational cycle. Therefore, each partial product produced from a computational cycle is multiplied by four (i.e., shifted two positions to the left) prior to the start of the next computational cycle. This shifting and loading is done only if bits of A remain in the first register 1. In other words, another computational cycle is not needed if the multiplicand has already been multiplied by all of the bits of the multiplier. Therefore, the transmitting means 49, which can be a multiplexer, has a first input connected to the first output 4 of the first register 1, a second input connected to the second output 5 of the first register 1, a first input bus connected to the Carry-outs 47 of the third sign-estimating means 46, a second input bus connected to the Save-outs 48 of the third sign-estimating means 46, a first output bus connected to the input bus 23 of the first partial product register 22, and a second output bus connected to the input bus 26 of the second partial product register 25.

A first carry-look-ahead adder 50 is used to convert the last partial product of the third sign-estimating means 46 from redundant form to non-redundant form. A carry-look-ahead adder is well known in the art as a device used to convert numbers in redundant form to non-redundant form in the shortest amount of time possible. A carry-look-ahead adder has two sets of inputs and one set of outputs. The carry-look-ahead adder adds the number presented to the first set of inputs to the number presented to the second set of inputs and transmits this sum in non-redundant form from the set of outputs. The first carry-look-ahead adder 50 used in the present invention is equal in bit length to the third sign-estimating means 46. The first set of inputs of the carry-look-ahead adder 50 is connected to the corresponding Carry-outs 47 of the third sign-estimating means 46. The second set of inputs of the carry-look-ahead adder 50 is connected to the corresponding Save-outs 48 of the third sign-estimating means 46. The first carry-look-ahead adder 50 has an output bus 51 for transmitting the non-redundant form of the last partial product of the third sign-estimating means 46.

A second carry-look-ahead adder 52 is used to do one last modulo reduction on the non-redundant form of the last partial product. The second carry-look-ahead adder 52 is equal in bit length to the first carry-look-ahead adder 50. A first set of inputs of the second carry-look-ahead adder 52 is connected to the output bus 51 of the first carry-look-ahead adder. A second set of inputs of the second carry-look-ahead adder 52 is connected to the output bus 11 of the third register (which contains $-C$). An output bus 53 of the second carry-look-ahead adder 52 transmits the non-redundant form of the modulo reduced last partial product.

A sign-determining means 54 determines whether the result of the last modulo reduction is positive or negative. If the result is positive the modulo reduced last partial product appearing at the output bus 53 of the second carry-look-ahead adder 52 is transmitted as $A \times B$ modulo C in non-redundant form from the output bus 55 of the sign-determining means 54. If the result is negative, the non-redundant last partial product appearing at the output bus 51 of the first carry-look-ahead adder 50 is transmitted as $A \times B$ modulo C from the output bus 55 of the sign-determining means 54. The sign determining means 54 is simply a comparator which compares the most significant bit of the output bus 53 of the second carry-look-ahead adder 52 to a one and a zero. This is not an estimation since all of the bits of the last partial product have been converted to non-redundant form. When a number has been converted in this manner, the most significant bit indicates the polarity of the number (a zero indicating a positive number and a one indicating a negative number). The comparator then controls a multiplexer which has a first set of inputs connected to the output bus 53 of the second carry-look-ahead adder 52, a second set of inputs connected to the output bus 51 of the first carry-look-ahead adder 50, and an output bus 55 for transmitting the result $A \times B$ modulo C.

It is known by the inventor that the present invention can be modified to scan the multiplier by any multiple of bits. A 3-bit scan approach would outperform a 2-bit scan approach by approximately 50%. A 3-bit scan approach would require one additional modulo reduction of the partial product by $-8C$ and generation of 4B, 5B, 6B, and 7B as compared to the 2-bit scan approach. The number of substantive bits used in the 3-bit sign-estimation after each modulo reduction would have to be increased over the number of bits used in the 2-bit sign-estimation. There is a deminishing return as the number of scan bits increase. A 4-bit scan would only outperform a 3-bit scan by approximately 33%. A 4-bit scan would also require one additional modulo reduction of the partial product by $-16C$ and the generation of 8B to 15B as compared to the 3-bit scan approach. The number of substantive bits used in the 4-bit sign-estimation would also have to increase from the number of bits used in the 3-bit sign estimation. After weighing performance versus circuit complexity, the inventor believes that the 2-bit scan approach is the best choice.

What is claimed is:

1. A device for performing an n-bit modular multiplication of $A \times B$ modulo C in approximately n/2 steps, where A denotes a binary multiplier of any length, C denotes an n-bit binary modulus where n is any positive integer, and B denotes a binary multiplicand having a magnitude less than the magnitude of C, comprising:

a) a first register having a first input for loading A, a second input for shifting the contents of said first register, a first output connected to the most significant bit position of said first register, and a second output connected to the next most significant bit position of said first register, the second input is used to shift the contents of said first register so that the contents of said first register appear two bits at a time at the first output and the second output of said first register;

b) a second register having an input for loading B and an output bus for transmitting B;

c) a third register having an input for loading $-C$ and an output bus for transmitting $-C$;

d) means, connected to the output bus of said second register, for generating 2B, said first generating means having an output bus for transmitting 2B;

e) means, connected to the output bus of said second register, for generating 3B, said second generating means having an output bus for transmitting 3B;

f) means, connected to the output bus of said third register, for generating $-4C$, said third generating means having an output bus for transmitting $-4C$;

g) means, connected to the output bus of said third register, for generating $-2C$, said fourth generating means having an output bus for transmitting $-2C$;

h) means, having a first control-input connected to said first output of said first register, a second control-input connected to the second output of said first register, a first input bus connected to the output bus of said second register, a second input bus connected to the output bus of said first generating means, and a third input bus connected to the output bus of said second generating means, for selecting one set of bits from the group of sets of bits consisting of binary zero, B, 2B, and 3B, said selecting means having an output bus for transmitting the set of bits selected, where binary zero is transmitted by the output bus of said selecting means when the decimal value of the most significant bit and the next most significant bit of said first register is zero, where B is transmitted by the output bus of said selecting means when the decimal value of the most significant bit and the next most significant bit of said first register is one, where 2B is transmitted by the output bus of said selecting means when the decimal value of the most significant bit and the next most significant bit of said first register is two, and where 3B is transmitted by the output bus of said selecting means when the decimal value of the most significant bit and the next most significant bit of said first register is three;

i) a first partial product register having an input bus for storing save-bits of partial products generated in performing A×B modulo C, and an output bus for transmitting the contents of said first partial product register, where said first partial product register has a length sufficient to store an n-bit binary number, three overflow bits, and a sign bit;

j) a second partial product register having an input bus for storing carry-bits of partial products generated in performing A×B modulo C, and an output bus for transmitting the contents of said second partial product register, where said second partial product register has a length equal to the length of said first partial product register;

k) a number of first-row full-adders equal to the length of said first partial product register, where each of said first-row full adders corresponds to one bit position of said first partial product register and said selecting means, each of said first-row full-adders having a first input connected to the corresponding bit position in the output bus of said first partial product register, a second input connected to the corresponding bit position in the output bus of said selecting means, a carry-input connected to the bit position in the output bus of said second partial product register that is one bit position less significant than the bit position of the output bus connected to the first input of the same first-row full-adder, a carry-output, and a save-output, for adding either zero, B, 2B, or 3B to the partial product contained in said first partial product register and said second partial product register based on the value of the two most significant bits in said first register;

l) a number of second-row full-adders equal to the length of said first partial product register, where each of said second-row full adders corresponds to one bit position of said first-row full-adders and said third generating means, each of said second-row full-adders having a first input connected to the save-output of said corresponding first-row full-adder, a second input connected to the corresponding bit position in the output bus of said third generating means, a carry-input connected to the carry-output of the first-row full-adder that is one bit position less significant than the save-output position connected to the first input of said second-row full-adder, a carry-output, and a save-output, for adding −4C to the partial product appearing at the carry-outputs and the save outputs of said first-row full-adders;

m) a first sign-estimating means, connected to the carry-outputs and the save-outputs of said first-row full-adders and the carry-outputs and the save-outputs of said second-row full-adders, for estimating the sign of the carry-outputs and the save-outputs of said second-row full-adders and transmitting the carry-outputs and the save-outputs of said second-row full-adders from corresponding carry-outputs and save outputs of said first sign-estimating means when the carry-outputs and the save-outputs of said second-row full-adders are estimated to be greater than or equal to zero and transmitting the carry-outputs and the save-outputs of said first-row full-adders otherwise;

n) a number of third-row full-adders equal to the length of said first partial product register, where each of said third-row full-adders corresponds to one bit position of said first sign-estimating means and said fourth generating means, each of said third-row full-adders having a first input connected to the corresponding save-output of said first sign-estimating means, a second input connected to the corresponding bit position in the output bus of said fourth generating means, a carry-input connected to the carry-output of said first sign-estimating means that is one bit position less significant than the save-output connected to the first input of said third-row full-adders, a carry-output, and a save-output, for adding −2C to the partial product represented by the carry-outputs and the save outputs of said first sign-estimating means;

o) a second sign-estimating means, connected to the carry-outputs and the save-outputs of said third-row full-adders and the carry-outputs and the save-outputs of said first sign-estimating means, for estimating the sign of the carry-outputs and the save-outputs of said third-row full-adders and transmitting the carry-outputs and the save-outputs of said third-row full-adders from corresponding carry-outputs and save-outputs of said second sign-estimating means when the carry-outputs and the save-outputs of said third-row full-adders are estimated to be greater than or equal to zero and transmitting the carry-outputs and the save-outputs of said first sign-estimating means otherwise;

p) a number of fourth-row full-adders equal to the length of said first partial product register, where each of said fourth-row full-adders corresponds to one bit position of said second sign-estimating means and said third register, each of said fourth-row full-adders having a first input connected to the corresponding save-output of said second sign-estimating means, a second input connected to the corresponding bit position in the output bus of said third register, a carry-input connected to the carry-output of said second sign-estimating means that is one bit position less significant than the save-output connected to the first input of said fourth-row full-adders, a carry-output, and a save-output, for adding −C to the partial product represented by the carry-outputs and the save-outputs of said second sign-estimating means;

q) a third sign-estimating means, connected to the carry-outputs and the save-outputs of said fourth-row full-adders and the carry-outputs and the save-outputs of said second sign-estimating means, for estimating the sign of the carry-outputs and the save-outputs of said fourth-row full-adders and transmitting the carry-outputs and the save-outputs of said fourth-row full-adders from corresponding carry-outputs and save-outputs of said third sign-estimating means when the carry-outputs and the save-outputs of said fourth-row full-adders are estimated to be greater than or equal to zero and transmitting the carry-outputs and the save-outputs of said second sign-estimating means otherwise;

r) means, connected to the carry-outputs and the save-outputs of said third sign-estimating means and at least one of said first output and said second output of said first register, for transmitting each save-output of said third sign-estimating means to the bit position in the input bus of said first partial product register that is two places more significant than each save-output of said third sign-estimating means and transmitting each carry-output of said third sign-estimating means to the bit position in the input bus of said second partial product register that is two places more significant than each carry-output of said third sign-estimating means if said first register contains any bits of A;

s) a first carry-look-ahead adder of length equal to the length of said first partial product register, having a first input bus connected to the save-outputs of said third sign-estimating means, a second input bus connected to the carry-outputs of said third sign-estimating means, and an output bus, for converting the redundant form of the carry-outputs and the save-outputs of said third sign-estimating means to a non-redundant form;

t) a second carry-look-ahead adder of length equal to the length of said first partial product register, having a first input bus connected to the output bus of said first carry-look-ahead adder, a second input bus connected to the output bus of said third register, and an output bus, for adding $-C$ to the product appearing at the output bus of said first carry-look-ahead adder; and u) means, connected to the output bus of said first carry-look-ahead adder and said output bus of said second carry-look-ahead adder, for determining the sign of the result appearing at the output bus of said second carry-look-ahead adder and transmitting the result appearing at the output bus of said second carry-look-ahead adder as $A \times B$ modulo $C$ from an output bus of said sign-determining means if the result appearing at the output bus of said second carry-look-ahead adder is greater than or equal to zero and transmitting the result appearing at the output bus of said first carry-look-ahead adder as $A \times B$ modulo $C$ from an output bus of said sign-determining means otherwise.

2. The device of claim 1 wherein said first sign-estimating means consists of:

a) a carry-look-ahead adder with a length of at least seven bits, said carry-look-ahead adder having an input bus connected to the most significant at least seven bits of the carry-outputs and the save outputs of said second-row full-adders, and having an output bus;

b) a comparator having a first input connected to the sign-bit of the output bus of said carry-look-ahead adder, a second input connected to binary zero, and an output for indicating the polarity of the sign-bit of said carry-look-ahead adder; and c) a multiplexer having a control-input connected to the output of said comparator, a first input-bus connected to the carry-outputs and the save-outputs of said first-row full-adders, a second input-bus connected to the carry-outputs and the save-outputs of said second-row full-adders, and an output bus for transmitting the carry-outputs and the save-outputs of said second-row full adders when the polarity of the carry-look-ahead adder is positive and transmitting the carry-outputs and the save outputs of said first-row full-adders otherwise.

3. A method of performing an n-bit modular multiplication of $A \times B$ modulo $C$ in approximately $n/2$ steps by a data processing system, where A denotes a binary multiplier of any length, C denotes a binary modulus of length n where n is any positive integer, and B denotes a binary multiplicand having a magnitude less than the magnitude of C, comprising the steps of:

a) loading A into a first register;

b) loading B into a second register;

c) loading $-C$ into a third register;

d) generating $2B$, $3B$, $-2C$ and $-4C$;

e) initializing a partial product register to a value of zero;

f) selecting a value from the group consisting of zero, B, 2B, and 3B based on the value of the two most significant bits of the first register by a multiplexer, where binary zero is selected if the two most significant bits of the first register have a value of zero, where B is selected if the two most significant bits of the first register have a value of one, where 2B is selected if the two most significant bits of the first register have a value of two, and where 3B is selected if the two most significant bits of the first register have a value of three;

g) adding the value selected in the previous step and the contents of the partial product register by a full-adder;

h) adding $-4C$ to the result of the previous step by a full-adder;

i) estimating the sign of the result of the previous step;

j) selecting the value obtained in step (h) if the sign in the previous step is estimated to be positive otherwise selecting the result of step (g) by a multiplexer;

k) adding $-2C$ to the value selected in the previous step by a full-adder;

l) estimating the sign of the result of the previous step;

m) selecting the value in step (k) if the sign in the previous step is estimated to be positive otherwise selecting the value selected in step (j) by a multiplexer;

n) adding $-C$ to the value selected in the previous step by a full-adder;

o) estimating the sign of the result of previous step;

p) selecting the value in step (n) if the sign in the previous step is estimated to be positive otherwise selecting the value selected in step (p) by a multiplexer;

q) shifting each bit of A in the first register to a bit position in the first register that is two positions more significant than the bit position previously occupied by each bit of A;

r) loading the value selected in step (p) into the partial product register so that each bit of the value obtained in step (p) is in a bit position in the partial product register that is two positions more significant than the bit position previously occupied by each bit of the value selected in step (p), loading zeros into the two least significant bit positions or the partial product register, and repeating the steps starting with step (f) if there are any bits of A contained in the first register otherwise proceed to the next step;

s) converting the value selected in step (p) to non-redundant form by a carry-look-ahead adder;

t) adding −C to the result of the previous step by a carry-look-ahead adder;

u) determining the sign of the result of the previous step; and v) returning the result of step (t) as A×B modulo C if the sign determined in the previous step is positive otherwise returning the result of step (s) as A×B modulo C.

4. The method of claim 3 wherein said step of estimating the sign of the result of step (h) is accomplished by:

a) converting the at least seven most significant bits of the result of (h) from redundant form to non-redundant form; and b) determining the value of the most significant bit of the result of the previous step, if the most significant bit of the result of the previous step is zero then the sign of the result of step (h) is estimated to be positive, if the most significant bit of the result of the previous step is one then the sign of the result of step (h) is estimated to be negative.

* * * * *